(No Model.)
P., J. & P. W. SOMMER.
CLAMP FOR WIRE FABRIC MACHINES.
No. 539,883. Patented May 28, 1895.
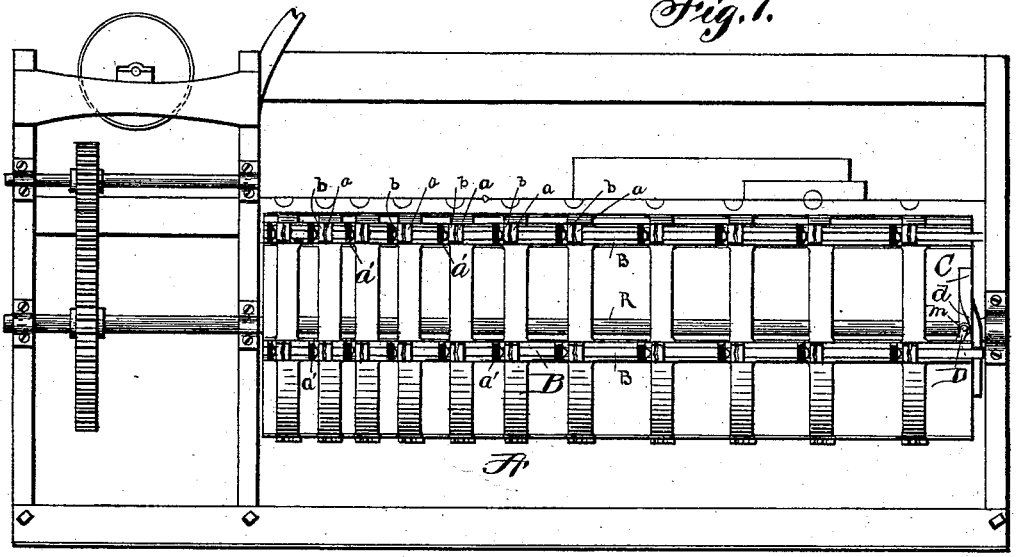
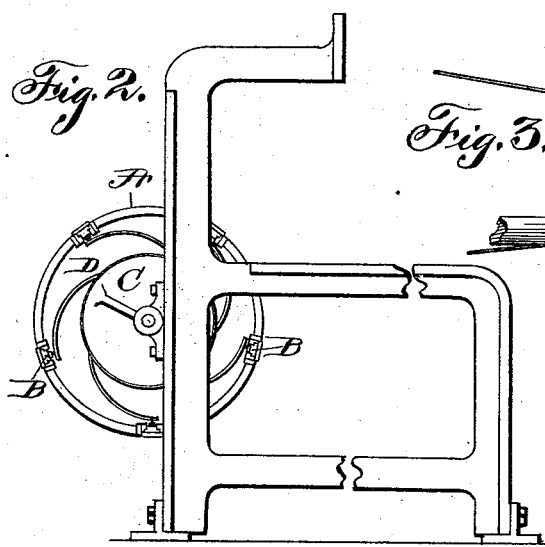
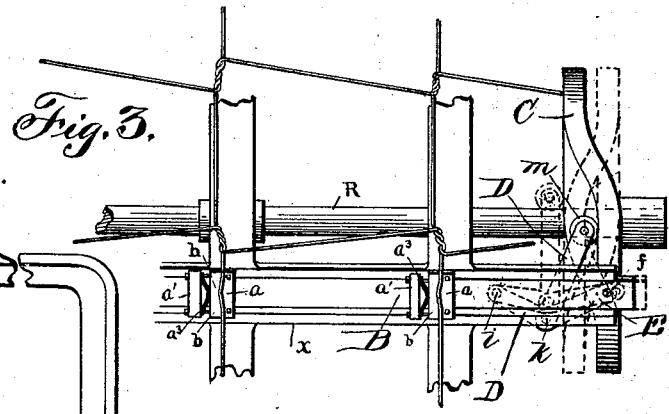
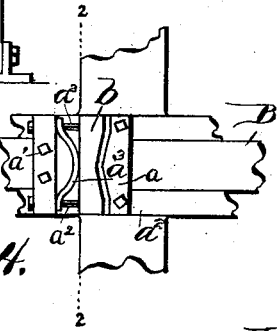
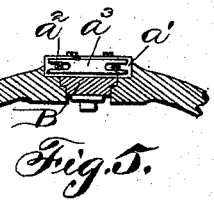
Witnesses:
Chas. W. LaPorte
Minnie Haley
Inventors.
Peter Sommer
John Sommer
Peter W. Sommer
By W. V. Zeff, Atty.

United States Patent Office.

PETER SOMMER, JOHN SOMMER, AND PETER W. SOMMER, OF TREMONT, ILLINOIS.

CLAMP FOR WIRE-FABRIC MACHINES.

SPECIFICATION forming part of Letters Patent No. 539,883, dated May 28, 1895.

Application filed December 26, 1893. Serial No. 494,719. (No model.)

*To all whom it may concern:*

Be it known that we, PETER SOMMER, JOHN SOMMER, and PETER W. SOMMER, citizens of the United States, residing at Tremont, in the county of Tazewell and State of Illinois, have invented certain new and useful Improvements in Clamps; and we do hereby declare that the following is a full, clear, and exact description of the invention, which will enable others skilled in the art to which it appertains to make and use the same.

Our invention relates to certain new and useful improvements in clamps revoluble with relation to the machine with which they are connected, by means of which a clamp is provided being simple in construction and very effective for the purpose designed.

More particularly our invention relates to a revoluble clamp designed to be used in connection with a fabric making machine purposed, through suitable mechanism provided upon its surface, to alternately engage and release the strands of a fabric being woven upon the machine with which the clamp is connected for the purpose of drawing out the said strands of the fabric being woven.

Our invention consists essentially of a cylindrically formed roller suitably constructed for lightness and cheapness and for durability, purposed to be mounted upon the framework of a fabric-making machine in suitable manner to provide for its rotation by the proper connection with suitable mechanism provided in the machine for turning it at the proper times and the proper distances.

Our invention consists essentially in the provision of a row or rows of jaws, suitably mounted upon a movable support, as the surface of a roller or cylinder, and of suitable mechanism, for actuating the said jaws, so as to cause them to alternately engage and release the strands of the fabric being woven upon the machine, and of certain other details of construction hereinafter more particularly described.

We use this clamp in connection with a wire fabric making machine and the particular connection thereof, with the machine with which we use it, is shown in our application for patent on wire fabric making machine now pending in the Patent Office and bearing the Serial No. 499,016, and dated February 3, 1894, in which said application the particular manner of operation of the device is shown and described.

That our invention may be more fully understood reference is had to the accompanying drawings, in which—

Figure 1 is a front elevation of the clamp, shown mounted upon the framework of the machine, so much only of the machine being shown as is necessary to illustrate the particular manner of mounting the said clamp. Fig. 2 is an end view of the clamp, showing the same mounted in a frame structure. Fig. 3 is a detailed view of a portion of the clamp, showing the detailed construction thereof and the particular mode of operation, whereby the wires of the fabric are engaged and released alternately for the purpose designed. Fig. 4 is a detailed view showing the particular formation of the respective jaws mounted upon the cylinder or surface of the roller. Fig. 5 is a section through the lines 2 2 of Fig. 4.

In the figures, A is a cylinder, formed of a series of bands, connected by cross pieces $x$, and mounted upon the axis R, which said axis is suitably journaled in the framework of the fabric machine, with which it may be connected, the said cylinder being designed for adjustment in a proper position to receive the strand delivery from the fabric making machine, and its particular adjustment in connection with a wire fabric making machine relative to the strand delivery elements thereof, may be seen by reference to our application for patent, Serial No. 499,016, filed February 3, 1894, hereinbefore referred to, in which the said cylinder is shown so adjusted, that the top surface of the said cylinder bears nearly on a line with a plane through a series of wire delivery sections or strands and in Fig. 1, of the drawings in this case, there are shown the relative positions of the said wire delivery sections, but are not referred to by letter nor their use specified, as they constitute no part of this application but are merely shown to facilitate the proper understanding of the device presented.

B are bars carried transversely upon the surface of the cylinder or in grooves cut in the surface of the said cylinder a sufficient depth to provide for the carrying of the said bars, so that their upper surfaces will align with the surface of the cylinder, said bars being so carried within the grooves thus cut in the surface of the cylinder as to accommodate an easy sliding movement back and forth in the said grooves.

$a$ are plates fixed upon the surface of the cylinder A in both transverse and circumferential rows, and in such a manner as to span the grooves in the surface of the cylinder in which the bars B are carried, and are useful to form the stationary portion of a series of jaws, provided upon the surface of the cylinder.

$b$ are plates carried upon the bars B, and are adjustable therewith. To facilitate in a yielding function necessary to be possessed by said plates $b$, which forms the other part, with plates $a$, of the series of jaws above referred to, the said plate $a$ is connected with plate $a'$, as shown in Figs. 4 and 5, which said plate $a'$ is bolted or fixed upon bar B, there being provided the spring $a^3$ bearing between the said parts, the said parts being connected and the spring held in position by the bolts $a^2$ fixed in plate $b$, and carried loosely through perforations in plate $a'$, whereby, the plate $b$ may yield to pressure by compressing the spring $a^3$, the bolts $a^2$ bearing backwardly through the slots or perforations in plate $a'$, the spring $a^3$ returning the plate $b$ to its normal position when pressure is removed, said yielding function of one portion of the complete jaw being provided to obviate a too rigid engagement of the strands of a fabric purposed to be engaged thereby.

To facilitate in the sliding movement of the bars B, within the slots in which they are carried, there are provided the angle bars D, one for each of said sliding bars B, pivoted to the cylinder A or the cross piece thereof as at $i$, and pivoted to the link or short bar E as at $k$, the said short bar or link E being pivoted to the sliding bar B as at $f$.

C is a stationary cam, suitably carried upon the frame work of the machine, it being upon the same center, or centering at the same point as the cylinder axis R, against which cam C or the irregular face thereof, the free ends of the angle bars D, through the anti friction rollers $m$ thereon, are designed to bear and travel as the cylinder A is revolved, whereby, when the said cylinder is revolved and the anti friction rollers $m$ on each of the angle bars D are caused to traverse the irregular surface of the stationary cam C, the said angle bars or the free ends thereof will be shifted, alternately, in opposite directions, which will cause a corresponding alternate movement of the respective bars B with which they connect, resulting in a corresponding movement of the parts of the respective jaws fixed upon the bars B, which will result in an alternate opening and closing of the said jaws.

For the purpose of illustrating different positions of the angle bar D in the revolution of the cylinder A, we have, for convenience, reversed the position of the cam C, and shown it in such position in dotted lines, instead of showing the cylinder turned to cause such adjustment of angle bar D.

The operation of the device is very simple. The cylinder A having first been adjusted upon the frame work of a machine in connection with which it is designed to be used to accommodate its free and easy rotation, and the parts of the complete clamp being in the relative positions shown in the drawings and the cylinder turned, the anti-friction roller $m$, as best shown in Fig. 3, will be caused to traverse, alternately, the raised and depressed portions of the cam, and the said cam C is so formed and adjusted with relation to the revoluble cylinder, that the said anti-friction rollers $m$ on the respective angle bars D will traverse the raised and depressed portions of the same at the proper times to best facilitate in the engagement and release of the strands of the fabric at the proper times, by the different rows of jaws, it being purposed, as illustrated in the drawings, that when the anti friction roller $m$, on angle bar D is in position shown in solid lines and bearing against the depressed portions of cam C, the said bar shall be drawn toward the said cam, so as to cause the plates $b$, to approach into strand engaging proximity to plates $a$, and to continue such engagement as long as the said anti-friction roller continues to traverse the said depressed portion of the cam, and until the anti-friction roller $m$ has reached the raised portion of the said cam, the assuming of which said position caused by the traversing the inclined approach thereto, causing the anti-friction roller and angle bar D to be shifted into positions shown in dotted lines in Fig. 3, which will cause the bar B to be shifted lengthwise from the face of the said cam C, and in such a manner as to cause the parts $b$ of the jaws, adjustably carried thereon, to be separated from the stationary parts of the jaws $a$, so that wires previously engaged will be released, the said anti friction roller $m$ being purposed to traverse, alternately, the raised and depressed portions of cam C, so as to cause an alternate opening and closing of the jaws and a consequent alternate engagement and release of the strands of the fabric.

In the operation of the clamp in connection with the complete machine, it is purposed that a given row of jaws shall engage the strands of a fabric at the top portion of the cylinder, and that such engagement shall continue until the said row of jaws shall have been carried, by the revolution of the cylinder, to the lower portion thereof, and that they will then release said strands so that the fabric may be carried rearwardly, and rolled upon a suitable reel that may be provided for that purpose; and that said jaws shall remain so open until in the revolution of the cylinder, they shall again be carried to the upper portion thereof, and until the strands of the fabric shall have been again carried between the parts of the said jaws, when it is purposed that they shall again be engaged and held in the manner just previously described, the operation of each particular row of jaws of the series mounted upon the cylinder being identical with that just above described.

While we have shown rows of jaws in connection with a revoluble cylinder, as we regard it as the best mode of carrying out the idea of their use, for the purpose of drawing out the strands of a fabric, yet we have other means of application of these jaws for the same purpose, namely, the carrying of a row of jaws horizontally back and forth lengthwise of the strands, the parts thereof adjustable with relation to each other, for the purpose of alternate opening and closing substantially in the same manner herein set forth, but we deem it unnecessary to carry out such plan by further illustration.

Having thus fully described our invention, what we claim, and desire to secure by Letters Patent, is—

1. A clamp, formed of a movable or traveling body, a row or rows of jaws, suitable mechanism for moving the said clamp body and suitable mechanism for alternately actuating the row or each independent row of jaws, for opening and closing, for engagement and release at the proper time of strands carried over the body of the clamp and between the parts of the jaws, all substantially as described and shown.

2. In a clamp, a revoluble cylinder, a row or rows of jaws carried upon the out-side surface of the said cylinder, suitable mechanism for turning the said cylinder intermittingly and suitable mechanism for actuating the said jaws, the row or each independent row, alternately for opening and closing for engagement and release at the proper time of strands carried over the surface of the said cylinder, all substantially as described and shown.

3. In a clamp, a revoluble cylinder, a number of rows of jaws adjusted at intervals apart and in parallel lines, longitudinal and circumferential, upon the surface of the said cylinder, suitable mechanism for intermittingly turning the cylinder and suitable mechanism for actuating each independent horizontally adjusted row of jaws or the parts thereof, for alternate opening and closing, each row of jaws successively, for engagement and release, at the proper time, of strands carried over the surface of the said cylinder, all substantially as described and shown.

4. In a clamp, the combination with the supporting body thereof, designed to travel or revolve, of a row or rows of jaws, and suitable mechanism for actuation for alternate opening and closing, whereby when the strands of a fabric are carried over the clamp and between the parts of the respective jaws, they will be alternately engaged by the said jaws, when it is desired that the strands shall be drawn out by the movement of the clamp and then released, substantially as shown.

5. In a clamp, for drawing out strands of a fabric being woven, a series of jaws, the parts thereof actuated for alternate engagement and release of the strands of the fabric, and movable lengthwise of the said strands, whereby when the jaws have engaged the strands and they are moved lengthwise of the said strands, the strands will be drawn out as the fabric is being formed.

6. In a clamp, for drawing out the strands of a fabric being woven, a series of jaws, the parts thereof actuated for alternate engagement and release of the strands of the fabric, and movable lengthwise of the said strands, and suitable mechanism for operating the said jaws for such engagement and release of the strands of the fabric, and suitable mechanism for moving the said clamp lengthwise of the said strands, whereby the strands of the fabric may be drawn out, substantially as described.

7. In a clamp, used in connection with a fabric making machine, the combination with a revoluble cylinder, of a number of rows of jaws, adjusted at intervals apart, suitable mechanism for operating the said jaws for alternate engagement and release of strands carried between the parts thereof, and suitable mechanism for turning the cylinder upon which the jaws are mounted, whereby when the said jaws are operated to engage the strands of the fabric being woven, and the cylinder is revolved, the strands will be drawn out, substantially as described.

8. In a clamp, used in connection with fabric making machines, a revoluble cylinder or roller, provided with rows of jaws upon its face or circumference, the parts of the respective jaws adjustable with relation to each other for alternately opening and closing, suitable mechanism for actuating said jaws, and suitable mechanism for revolving the clamp, all substantially as described and shown.

9. In a clamp for fabric machines, the combination with the clamp cylinder or roller, of a number of rows of jaws, the parts of each respective jaw one being stationary and the other adjustable, and each adjustable part of the respective jaws of each row designed for simultaneous actuation for either opening or closing, and suitable mechanism for actuating the said parts of the respective jaws, and suitable mechanism for turning the said cylinder or roller, whereby the strands of the fabric, being carried between the parts of the respective jaws, are engaged, and the clamp revolved to draw out the said strands, such engagement being maintained for some distance in the revolution of the roller or clamp, and the strands then released by the opening of the said jaws, all substantially as described and shown.

10. In a clamp, for drawing out the strands of a fabric, the combination with the clamp cylinder or roller, of a number of rows of jaws upon the face thereof, alternately opening and closing, and each row successively engaging the strands, and suitable mechanism for alternately opening and closing the said jaws, and mechanism for causing the successive engagement of the strands by each row of jaws, and mechanism for turning the said clamp or roller, whereby the strands of the fabric are alternately engaged and released, the clamp revolved during such engagement by the said jaws, to draw out the fabric, and whereby each row of jaws engages and draws out the said strands successively, all substantially as described and shown.

11. In a clamp, for fabric making machines, the combination with the clamp cylinder, or roller, of a series of rows of jaws, one portion of each respective jaw stationary with relation to the cylinder, and the other portion of each respective jaw, being adjustably carried upon a sliding bar, and suitable mechanism for shifting the said bar or bars to open and close the said jaws, and suitable mechanism for turning the clamp roller or cylinder, upon which they are mounted, whereby when the strands of a fabric are engaged by the said jaws or by one row thereof at a time, and by each row successively and the clamp roller or cylinder is turned, the said strands will be drawn out, and when so drawn out by any particular row of jaws by the continuance of the engagement for some distance in the revolution of the roller, said strands will then be released by the said jaws, all substantially as described and shown.

12. In a clamp, for fabric making machines, a cylinder or roller, suitably adjusted for rotation upon its axis, a series of rows of jaws thereon, for alternate opening and closing, suitable mechanism for actuating the said jaws for such alternate opening and closing, and suitable mechanism for turning the said cylinder or roller, all substantially as described and shown.

13. In a clamp, for fabric making machines, a cylinder or roller, suitably mounted for rotation upon its axis, a series of rows of jaws, one part of each respective jaw having a fixed relation with the cylinder, and one part of each respective jaw being mounted upon a sliding bar, suitable mechanism for shifting the said bar for causing an alternate approach and separation of the respective parts of the said jaws, and suitable mechanism for turning the said cylinder or roller, whereby, the strands of a fabric will be engaged by the near approach of the parts of the respective jaws, and will be drawn out by the turning of the cylinder or roller the distance desired by one row of jaws, will be released by said row of jaws, and engaged by the next succeeding row and will again draw out and will release at the proper time to best facilitate in the operation of the clamp, all substantially as described and shown.

14. In a clamp, for fabric making machines, the combination, with a revoluble clamp cylinder or roller, provided with rows of jaws, one part of each respective jaw stationary with relation to the body of the cylinder, and the other part of each respective jaw, and those in each particular row, fixed upon an adjustable bar suitably carried for sliding, in the face of the said cylinder, of a stationary cam, plate or disk, and suitable adjustable levers having pivotal connections with the said sliding bars and the frame work of the cylinder, and a bearing relation with the face of the said cam, whereby, as the cylinder is turned, with one end of a lever connected therewith and the other end, which may be provided with an anti friction roller, bearing against the irregular face of the said cam, the said levers are shifted to cause the said bars carrying the adjustable jaws to be shifted alternately in opposite directions, all substantially as described and shown.

15. In a clamp, for fabric making machines, the combination, with the cylinder A, suitably mounted for rotation, and provided with a number of jaws, the parts a, a, stationary with relation to the face of the cylinder, the other parts of the respective jaws adjustably carried upon the bars B, each of said bars being provided with the pivoted levers D and E, of the stationary cam C, whereby when the cylinder A is revolved, with the lever D suitably connected with sliding bars B, and with the said cylinder, and with the free end thereof, through the anti friction roller m, having a bearing relation against the irregular face of the stationary cam C, the said lever D will be shifted alternately in opposite directions, causing a corresponding alternate opposite direction of movement of the respective bars B, with which they are connected, to facilitate in the engagement and release of the strands of a fabric carried over said cylinder, all substantially as described and shown.

16. In a clamp, for fabric making machines, the combination, with the cylinder A thereof, of the jaws, formed of the stationary parts a, and the adjustable parts fixed upon sliding bars B, the mechanism for moving the said bars B alternately in opposite directions, consisting of the angle bar D, pivoted to the frame work of the cylinder, and pivoted to link E, which is pivoted to the sliding bar B, and the cam C, with which the free end of angle bar D has a bearing relation, through the anti friction roller m thereon, whereby when the cylinder is turned, the said bars B will be shifted, alternately, in opposite directions, for the purpose of alternate engagement and release of the strands of a fabric carried over the said cylinder, all substantially as described and shown.

17. In a clamp, for fabric making machines, the combination with a traveling support, of a jaw or a row of jaws, the part a, thereof stationary with relation to the said traveling support, and the part b thereof being adjustably carried upon the bar B, suitable mechanism for shifting the said bar, and suitable mechanism for moving the said jaw support, all substantially as described and shown.

18. In a clamp, for fabric making machines, the combination, with the cylinder A thereof, suitably journaled for rotation, of a row or rows of jaws, formed of the parts $a$, having fixed relation with the cylinder, and the parts $b$ having a yielding connection with part $a'$ fixed upon the adjustable bar B, and suitable mechanism for actuating the said bar B for alternately opening and closing the said jaws, all substantially as described and shown.

19. In a clamp, for fabric making machines, the combination, with the plate $a$, having a fixed relation with the cylinder A, but revoluble therewith, forming one part of a jaw, of the adjustable portion of the said jaw, composed of the parts $b$ and $a'$ separated by spring $a^3$, and adjustable with relation to each other, by means of pins $a^2$ fixed in part $b$ and carried loosely through perforations in part $a'$, the said parts being fixed upon bar B, and suitable mechanism for alternately shifting the said bar in opposite directions, to alternately open and close the said jaws, all substantially as described and shown.

20. In a clamp, for fabric making machines, the combination, with a cylinder or roller, of a number of bars adjusted transversely upon the face of the said roller from the direction of movement thereof, provided with a series of jaw parts adjustable therewith for close approaching relation with stationary pieces upon the said cylinder, for forming the complete jaw, and suitable mechanism for actuating the said bars for causing the said jaws to alternately open and close, all substantially as described and shown.

In testimony whereof we affix our signatures in presence of two witnesses.

PETER SOMMER.
JOHN SOMMER.
PETER W. SOMMER.

Witnesses:
BERTHA ZIEGLER,
SAMUEL CALHOUN.